(12) United States Patent
Adamski

(10) Patent No.: US 7,855,365 B2
(45) Date of Patent: Dec. 21, 2010

(54) METHOD AND APPARATUS FOR DETECTING X-RAYS HAVING IMPROVED NOISE DISCRIMINATION

(75) Inventor: John L. Adamski, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 90 days.

(21) Appl. No.: 11/970,255

(22) Filed: Jan. 7, 2008

(65) Prior Publication Data

US 2009/0173881 A1 Jul. 9, 2009

(51) Int. Cl.
*G01T 1/00* (2006.01)
*G01T 1/185* (2006.01)
*B01D 59/44* (2006.01)
*H01J 49/00* (2006.01)

(52) U.S. Cl. .............. 250/336.1; 250/283; 250/298; 250/299; 250/389; 250/394

(58) Field of Classification Search .............. 378/137
See application file for complete search history.

(56) References Cited

U.S. PATENT DOCUMENTS 4,731,531 A 3/1988 Handke 4,954,709 A * 9/1990 Zigler et al. .............. 250/385.1

OTHER PUBLICATIONS

"Electromagnetic Spectrum -Introduction" NASA Goddard Space Flight Center, http://imagine.gsfc.nasa.gov/docs/science/know_l1/emspectrum.html, 1997-2010.*

* cited by examiner

*Primary Examiner*—David P Porta
*Assistant Examiner*—Carolyn Igyarto
(74) *Attorney, Agent, or Firm*—Alston & Bird LLP

(57) ABSTRACT

A method and apparatus, such as a spectrometer, are provided for facilitating the detection of an gamma signal in a manner that effectively discriminates the gamma signal from noise. A spectrometer may be provided which includes an gamma converter for converting gamma signals which impinge thereupon into corresponding pairs of electrons and positrons. The spectrometer also includes a deflector for separately deflecting the electrons and the positrons as well as electron and positron detectors for separately detecting the deflected electrons and positrons, respectively. As such, an gamma signal can be identified in instances in which the deflected electrons and positrons are detected in coincidence.

23 Claims, 2 Drawing Sheets

METHOD AND APPARATUS FOR DETECTING X-RAYS HAVING IMPROVED NOISE DISCRIMINATION

FIELD

Embodiments of the present invention are generally directed to methods and apparatus for detecting x-rays and, more particularly, to methods and apparatus for detecting x-rays, such as those employed for gamma communication, having improved noise discrimination.

BACKGROUND

The use of x-rays for communication is of interest since gamma communication would offer advantages to more traditional communication techniques in at least some circumstances. In this regard, x-rays could support communication over long distances and be capable of transmitting large amounts of data with relatively small amounts of power in comparison to that required by conventional communication techniques attempting to provide similar performance. In order to provide for gamma communication, gamma beams that are very directional and that have been modulated, such as by being time modulated, will likely be required. These directional, modulated gamma beams would then be received by a detector that most likely have an ultra-fast response time in order to detect and demodulate the gamma signals.

Conventional gamma detectors utilize large area scintillators having light sensing photomultipliers or solid state detectors. The scintillators generally measure all signals that are received with only limited abilities to distinguish between the actual signals and noise, such as that generated by natural radiation. Some scintillators consider the magnitude of the received signals in an effort to distinguish the actual signals from noise, but the response time of these scintillators is generally somewhat limited which, in turn, would disadvantageously limit the data bandwidth if the scintillators were employed in an gamma communication application.

In addition to the response time, the ability of a detector to reject or discriminate noise relative to the actual signal will likely be of import in conjunction with gamma communication applications. In this regard, it is anticipated that an gamma communication link could suffer from radiation noise from natural space particle and photon emissions as well as from cosmic rays. The difficulties created by such radiation noise may also be compounded in situations in which the gamma source for the gamma communications does not provide a sufficiently intense gamma beam as to ensure a good signal to noise ratio at the detector in a background of natural space radiation. The difficulties created for gamma communications by the noise could be particularly apparent, for example, in conjunction with gamma communication by spacecraft in background regions having relatively high natural space radiation as well as by spacecraft during atmospheric re-entry at that period of time when conventional communications are blocked out by the plasma layer.

Accordingly, it would be desirable to provide a technique for improved gamma communications. In particular, it would be desirable to provide an improved technique for gamma communications which facilitates the rejection or discrimination of noise relative to the actual gamma communication signals.

BRIEF SUMMARY OF THE INVENTION

Various embodiments of the present invention are therefore provided for facilitating the detection of an gamma signal in a manner that effectively discriminates the gamma signal from noise. As such, one or more embodiments of the present invention may support gamma communication even in the presence of radiation noise, such as from natural space particle and photon emissions or the like.

In accordance with one embodiment, a spectrometer is provided which includes an gamma converter for converting gamma signals which impinge thereupon into corresponding pairs of electrons and positrons. The spectrometer of this embodiment also includes a deflector for separately deflecting the electrons and the positrons as well as electron and positron detectors for separately detecting the deflected electrons and positrons, respectively. As such, an gamma signal can be identified in instances in which the deflected electrons and positrons are detected in coincidence, i.e., coincidentally.

In one embodiment, the electron and positron detectors each comprise a plurality of detector elements spaced along a path of the electrons and positrons. In this regard, the detector elements of the electron and positron detectors may be positioned in pairs, with each pair including a detector element of the electron detector and a detector element of the positron detector. Further, each pair of detector elements may be spaced from the deflector along the path of the electrons and positrons by a different distance. However, each detector element of a respective pair may be positioned at the same distance from the deflector.

The spectrometer may also include a processor configured to determine that a pair of electrons and positrons detected by the electron and positron detectors, respectively, are coincident based upon a time and location at which the electron and positron detectors detect the electrons and positrons, respectively. In this regard, the processor may be configured to identify the gamma signals based upon the pairs of electrons and positrons that are determined to be coincident. Further, the processor may be configured to identify the gamma signals without consideration of the electrons and positrons detected by the electron and positron detectors that are not coincident. As such, the processor of this embodiment can generally discriminate between noise and the actual gamma signals since the noise will not typically create electrons and positrons that are detected in coincidence. The processor may also be configured to decode the signal represented by the pairs of electrons and positrons that are determined to be coincident, such as by demodulating a time-modulated gamma signal received by the spectrometer.

In accordance with another embodiment, a method is provided which converts gamma signals into corresponding pairs of electrons and positrons. The electrons and positrons are then separately deflected. The deflected electrons and positrons are then separately detected, and an gamma signal is identified in instances in which the deflected electrons and positrons are detected in coincidence. By requiring coincidence, the method of this aspect of the present invention can effectively discriminate an gamma signal from noise.

In one embodiment, the separate detection of the electrons and positrons includes the separate detection of the electrons and positrons with a plurality of detector elements spaced along the path of the electrons and positrons. In this embodiment, the method may also include a determination that a pair of electrons and positrons that have been detected are coincident based upon a time and location at which the electrons and positrons are detected. An gamma signal can therefore be identified in instances in which the pair of electrons and positrons are determined to be coincident in both time and location, but not in instances in which the electrons and/or positrons are detected but are not coincident. Further, the method may include decoding of the signal represented by the pairs of electrons and positrons that are determined to be coincident, thereby permitting an incident gamma signal to be demodulated.

By filtering the electrons and positrons that are detected in coincidence from those that are not coincident, an gamma signal can be discriminated from noise, thereby facilitating gamma communication even in instances in which there is natural space particle and photon emission or other radiation noise.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
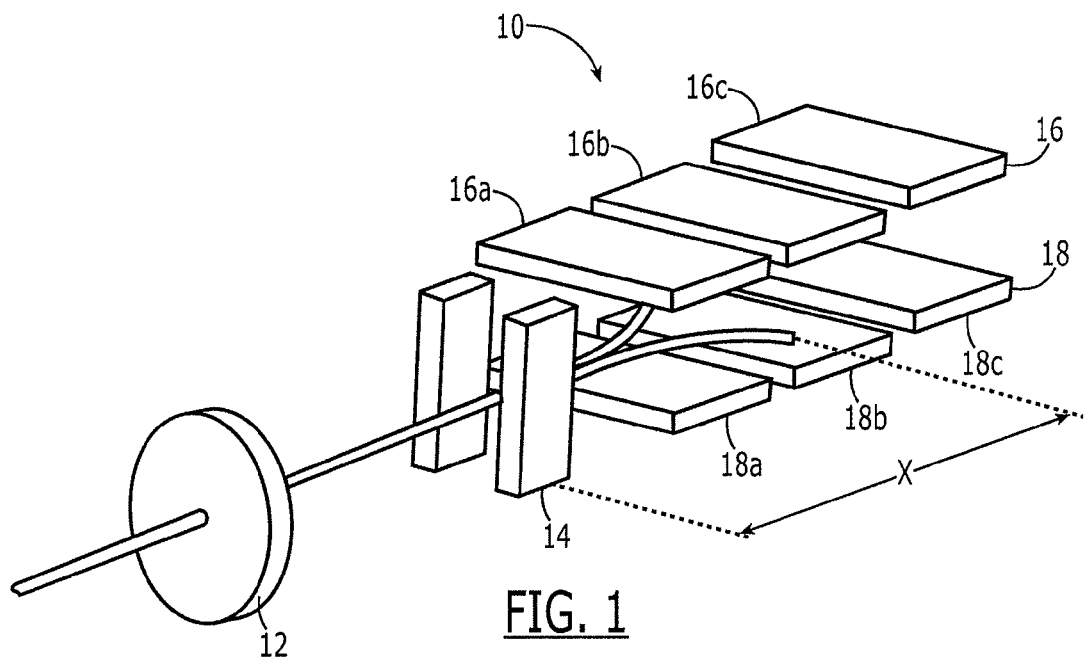
FIG. 1 depicts the spectrometer according to one embodiment of the present invention.

Referring now to FIG. 1, a spectrometer 10 in accordance with one embodiment to the present invention is depicted. As described herein, the spectrometer may be utilized in conjunction with gamma communication applications, such as communication to, from or between spacecraft. However, the spectrometer may be utilized in other applications, if so desired. As shown in FIG. 1, the spectrometer of this embodiment may include an gamma converter 12 upon which an gamma beam impinges. In the embodiment in which the spectrometer supports gamma communications, the gamma beam may be comprised of modulated gamma signals, such as time-modulated gamma signals. As described in more detail below, the gamma beam that impinges upon the gamma converter generally has a relatively high energy level, such as 10 MeV or greater.

The gamma converter 12 converts the gamma signals that impinge thereupon into corresponding pairs of electrons and positrons. See also block 30 of FIG. 4. While the spectrometer may include a variety of different types of gamma converters, the gamma converter of one embodiment is a relatively thin metallic sheet. While the relatively thin metallic sheet may have various thicknesses and may be formed of various metals, the gamma converter of one embodiment may be about 1 millimeter in thickness and may be formed of aluminum, tungsten or the like.

Figure 2:
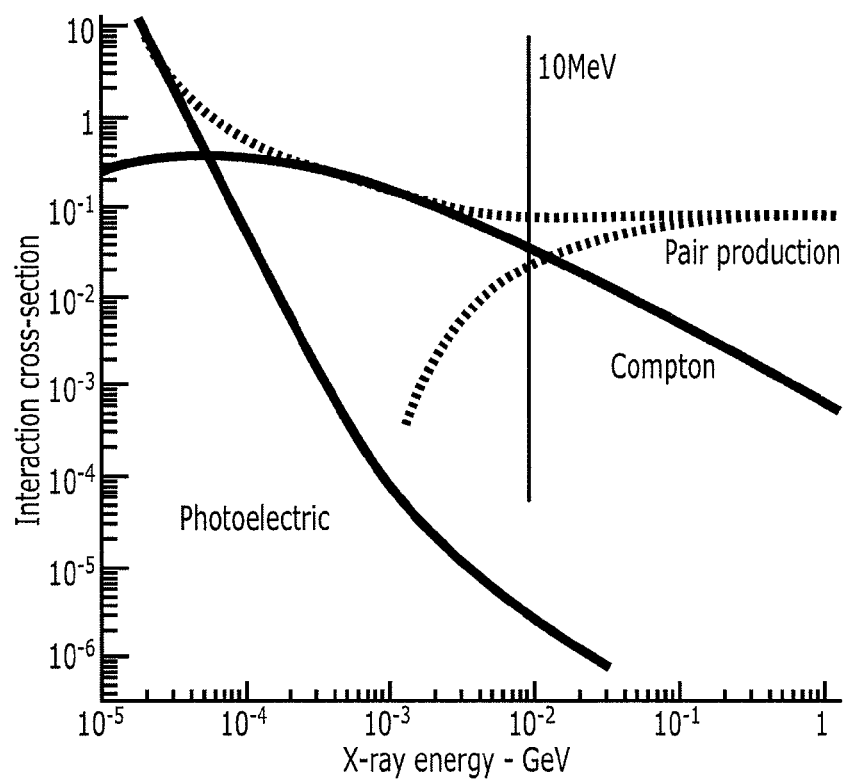
FIG. 2 is a graph of interaction cross-section as a function of gamma energy which shows pair production to be common for gamma signals having an energy of 10 MeV or greater.

For gamma beams having an energy of 10 MeV or greater, the gamma beams are generally efficiently converted into corresponding electron/positron pairs. In this regard, FIG. 2 graphically depicts the interaction cross-section as a function of the gamma energy in GeV. While photoelectric and Compton interactions may dominate at lower energy levels, pair production dominates for energy levels of about 10 MeV and above. As such, the gamma converter 12 of one embodiment to the present invention is effective for converting gamma signals into corresponding pairs of electrons and positrons, at least for gamma signals having energy levels of about 10 MeV and greater.

The spectrometer 10 of the embodiment depicted in FIG. 1 also includes a deflector 14 for separately deflecting the electrons and the positrons. See also block 32 of FIG. 4. In one embodiment, the deflector is comprised of a pair of rare earth permanent magnets that are spaced apart from one another with the electrons and positrons generated by the converter passing therebetween. Various rare earth permanent magnets may be utilized including, for example, Samarium Cobalt magnets which are available with high field strength. These magnets can be a few centimeters long and spaced at a few centimeters with fields of several thousand Gauss to provide a dipole magnet that can serve as a magnetic spectrometer for the electrons and positrons emitted from the converter 12. Based upon the interaction of the electrons and positrons with the magnetic field established by the pair of rare earth permanent magnets, the positrons and electrons are deflected in different manners, thereby effectively separating the electrons and the positrons.

Although the spectrometer 10 may have various orientations, the spectrometer of the embodiment depicted in FIG. 1 includes two rare earth permanent magnets with aligned magnetic field vectors and positioned in respective vertical planes, but separated from one another in a horizontal direction. The electrons and positrons passing between the pair of rare earth permanent magnets are therefore deflected in opposite vertical directions as shown in the example of FIG. 1. However, the rare earth permanent magnets could be repositioned, such as to extend horizontally while being spaced apart from one another in a vertical direction, in order to deflect the electrons and positrons in opposite horizontal directions such as to the left and right.

As also shown in FIG. 1, the spectrometer 10 of one embodiment includes electron and positron detectors 16, 18 for separately detecting the deflected electrons and positrons. See also block 34 of FIG. 4. As shown, the electron and positron detectors are generally positioned so to receive the electrons and positrons, respectively, following their deflection. In the embodiment of FIG. 1, for example, the electron and positron deflectors extend horizontally and are spaced apart from one another in a vertical fashion. As noted above, in conjunction with the deflector 14, however, the electron and positron detectors can be oriented and positioned in other manners if the deflector is configured to deflect the electrons and positrons in a different direction.

The electron and positron detectors 16, 18 are generally configured to permit a determination to be made as to whether an electron/positron pair was detected in coincidence, typically both positionally and temporally. To facilitate this determination of coincidence, the electron and positron detectors of one embodiment may each include a plurality of detector elements spaced along a path of the electrons and positrons. In this regard, the detector element 5 may be positioned in pairs with each pair including a detector element of the electron detector and a detector element of the positron detector. With respect to the embodiment depicted in FIG. 1, each of the electron and positron detectors include three detector elements which are positioned relative to one another to similarly defined three pairs of detector elements designated as a, b and c in FIG. 1. As also shown in FIG. 1, each pair of detector elements is generally spaced from the deflector 14 along the path of the electrons and positrons by a different distance. For a respective pair of deflector elements, however, each detector element is typically positioned at the same distance from the deflector. With respect to the embodiment of FIG. 1, for example, the detector elements 16b, 18b of the second pair are both generally positioned the same distance from the deflector, but a different distance from the deflector that either the first or third pairs of detector elements.

While the electron and positron detectors 16, 18 can be configured in different manners, the electron and positron detectors of one embodiment may each be formed of a micro-channel plate photomultiplier detector. In this regard, a micro-channel plate photomultiplier detector includes a plurality of detector elements designed for ultra-fast operation with, for example, a gigahertz bandwidth and is configured to provide information in the form of sub-nanosecond signals regarding the occurrence, time and location at which an electron or positron was received by a respective detector element. Depending upon the size of the detector elements, the electron and positron detectors can provide information regarding the particular location at which an electron or positron is incident or, if the detector elements are sufficiently small, merely the particular detector element upon which the electron or positron impinges.

Figure 3:
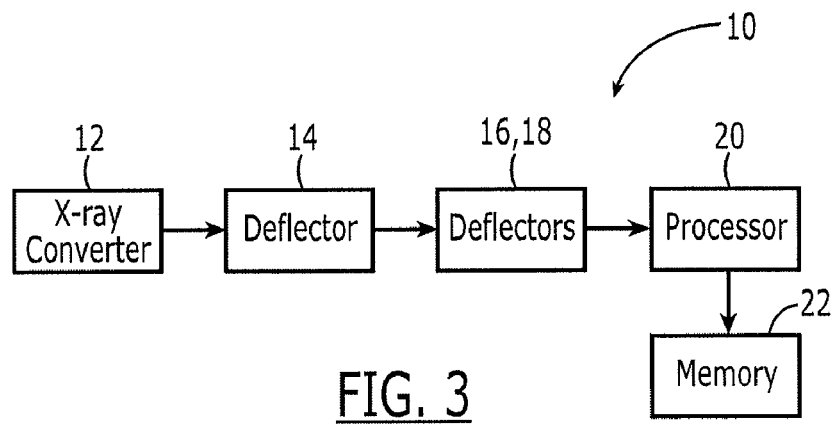
FIG. 3 is a block diagram of a spectrometer according to one embodiment of the present invention.

In terms of detection, an gamma signal that is converted by the gamma converter 12 will create an electron and a positron that will be separately deflected by the deflector 14, but will arrive at and be detected by the electron and positron detectors 16, 18 at the same time and at the same distance from the deflector, such as a distance x as depicted in FIG. 1. As such, the spectrometer 10 may include a processor 20, such as shown in FIG. 3 for receiving signals from the electron and positron detectors indicative of the electrons and positrons incident thereupon. More particularly, the processor generally receives information from the electron and positron detectors indicative of timing and energy level of the respective electron or positron, the location of incidence of the respective electron or positron upon the detector element and the time at which the respective electron or positron was detected. The processor can then determine if a pair of electrons and positrons was detected in coincidence, i.e., simultaneously. See block 36 of FIG. 4. In one embodiment, for example, the processor can determine if an electron and a positron were detected at the same time and corresponding relative location as a result of being detected by different detector elements of a detector element pair that are correspondingly spaced and oriented.

If the processor 20 determines that an electron and a positron were detected in coincidence, the processor can correspondingly identify the electron and the positron as being the product of an gamma signal that has been received by the spectrometer 10. See block 38 of FIG. 4. Alternatively, if the processor receives information from one or both of the electron and positron detectors that indicates the receipt of an electron and/or a positron that is not detected in coincidence, the processor can disregard the electron or positron that lacks coincidence since such electrons or positrons may be indicative of noise as opposed to an actual gamma signal. See block 40 of FIG. 4. By disregarding the electrons and positrons received by the electron and positron detectors, respectively, that are not received in coincidence, the spectrometer of one embodiment to the present invention can effectively distinguish gamma signals from noise since noise does not generally produce an electron/positron pair that is received in coincidence by the electron and positron detectors 16, 18 as would an gamma signal and, in particular, an gamma signal having an energy level of about 10 MeV or greater. The requirement of coincidence can also serve to advantageously suppress the otherwise deleterious effects of the signals attributable to a cosmic ray transiting the spectrometer since it would be unlikely that such a cosmic ray would strike both the electron and positron detectors at the same location and at the same time as would be required for the processor to identify the detected electrons and positrons as being coincident and therefore indicative of an actual gamma signal.

Based upon the actual gamma signals that are detected by the electron and positron detectors 16, 18 and identified by the processor 20, the processor can decode the gamma signals such that the incident gamma signals can be properly interpreted and therefore used for communication purposes. See block 42 of FIG. 2. For time-modulated gamma signals, the process may be configured to demodulate the gamma signals and recover the original communication.

A common element can include both the electron and positron detectors 16, 18 and the processor 20. Alternatively, the electron and positron detectors and the processor can be separate and distinct from one another albeit in communication with one another. In either embodiment, the processor may be formed of a microprocessor, a controller, an application specific integrated circuit (ASCI), a field programmable gate array (FGPA) or other computing device.

According to one aspect of the present invention, the processor 20 which implements embodiments of the present invention generally operates under control of a computer program product. The computer program product for performing the methods of embodiments of the present invention includes a computer-readable storage medium, such as memory 22, and computer-readable program code portions, such as a series of computer instructions, embodied in the computer-readable storage medium.

Figure 4:
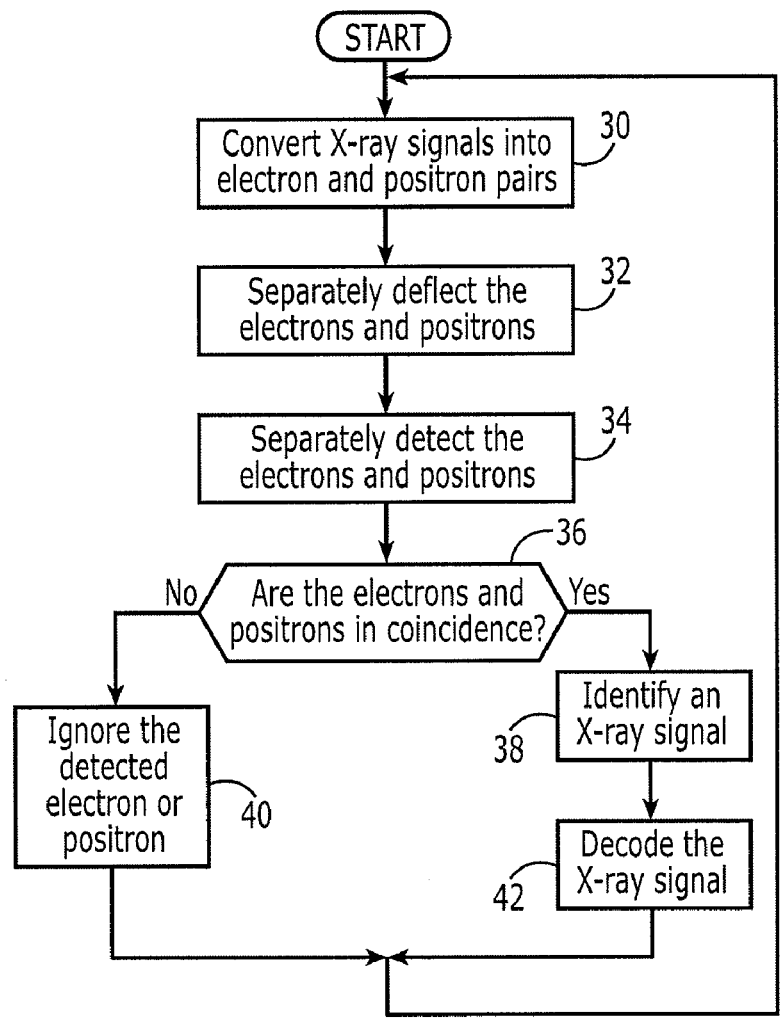
FIG. 4 is a flow chart illustrating the operation performed in accordance with one embodiment of the present invention.

In this regard, FIG. 4 is a flowchart of method, apparatus and program products according to exemplary embodiments of the present invention. It will be understood that each block or step of the flowchart, and combinations of blocks in the flowchart, and combinations of blocks in the flowchart, can be implemented by computer program instructions. These computer program instructions may be loaded onto a computer or other programmable apparatus, such as processor 20, to produce a machine, such that the instructions which execute on the computer or other programmable apparatus create means for implementing the functions specified in the flowchart block(s) or step(s).

The above computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware- That which is claimed:

1. A spectrometer comprising:
    an gamma converter for converting gamma signals which impinge thereupon into corresponding pairs of electrons and positrons;
    a deflector, spaced apart from and downstream of the gamma converter, for separately deflecting the electrons and the positrons; and
    electron and positron detectors for separately detecting the deflected electrons and positrons in order to permit an gamma signal to be identified in instances in which the deflected electrons and positrons are detected in coincidence.

2. A spectrometer according to claim 1 wherein the electron and positron detectors each comprise a plurality of detector elements spaced along a path of the electrons and positrons.

3. A spectrometer according to claim 2 wherein the detector elements of the electron and positron detectors are positioned in pairs with each pair comprising a detector element of the electron detector and a detector element of the positron detector.

4. A spectrometer according to claim 3 wherein each pair of detector elements is spaced from the deflector along the path of the electrons and positrons by a different distance, and wherein each detector element of a respective pair is positioned at the same distance from the deflector.

5. A spectrometer according to claim 1 further comprising a processor for determining that a pair of electrons and positrons detected by the electron and positron detectors, respectively, are coincident based upon a time and location at which the electron and positron detectors detect the electrons and positrons, respectively.

6. A spectrometer according to claim 5 wherein the processor is configured to identify the gamma signals based upon the pairs of electrons and positrons that are determined to be coincident.

7. A spectrometer according to claim 6 wherein the processor is further configured to identify the gamma signals without consideration of the electrons and positrons detected by the electron and positron detectors that are not coincident.

8. A spectrometer according to claim 6 wherein the processor is further configured to decode the signal represented by the pairs of electrons and positrons that are determined to be coincident.

9. A method comprising:
    converting gamma signals into corresponding pairs of electrons and positrons;
    deflecting the electrons and the positrons separately following propagation of the corresponding pairs of electrons and positrons in a downstream direction;
    detecting the deflected electrons and positrons separately; and
    identifying an gamma signal in instances in which the deflected electrons and positrons are detected in coincidence.

10. A method according to claim 9 wherein separately detecting the electrons and positrons comprises separately detecting the electrons and positrons with a plurality of detector elements spaced along a path of the electrons and positrons.

11. A method according to claim 9 further comprising determining that a pair of electrons and positrons that have been detected are coincident based upon a time and location at which the electrons and positrons are detected.

12. A method according to claim 11 further comprising identifying the gamma signals based upon the pairs of electrons and positrons that are determined to be coincident in time and location.

13. A method according to claim 12 wherein identifying the gamma signals comprises identifying the gamma signals without consideration of the electrons and positrons that have been detected, but that are not coincident.

14. A method according to claim 12 further comprising decoding the signal represented by the pairs of electrons and positrons that are determined to be coincident.

15. A spectrometer comprising:
    an gamma converter for converting gamma signals which impinge thereupon into corresponding pairs of electrons and positrons;
    a deflector, spaced apart from and downstream of the gamma converter, for separately deflecting the electrons and the positrons;
    electron and positron detectors for separately detecting the deflected electrons and positrons, wherein the electron and positron detectors each comprise a plurality of detector elements spaced along a path of the electrons and positrons; and
    a processor configured to determine that a pair of electrons and positrons detected by the electron and positron detectors, respectively, are coincident based upon a time and location at which the electron and positron detectors detect the electrons and positrons, respectively, wherein the processor is also configured to identify the gamma signals based upon the pairs of electrons and positrons that are determined to be coincident.

16. A spectrometer according to claim 15 wherein the processor is further configured to identify the gamma signals without consideration of the electrons and positrons detected by the electron and positron detectors that are not coincident.

17. A spectrometer according to claim 15 wherein the processor is further configured to decode the signal represented by the pairs of electrons and positrons that are determined to be coincident.

18. A spectrometer according to claim 15 wherein the electron and positron detectors each comprise a plurality of detector elements spaced along a path of the electrons and positrons.

19. A spectrometer according to claim 18 wherein the detector elements of the electron and positron detectors are positioned in pairs with each pair comprising a detector element of the electron detector and a detector element of the positron detector.

20. A spectrometer according to claim 19 wherein each pair of detector elements is spaced from the deflector along the path of the electrons and positrons by a different distance, and wherein each detector element of a respective pair is positioned at the same distance from the deflector.

21. A spectrometer according to claim 1 wherein said deflector comprises a pair of magnets spaced apart from one another and positioned such that the corresponding pairs of electrons and positrons pass therebetween.

22. A method according to claim 9 wherein deflecting the electrons and positrons comprises permitting the corresponding pairs of electrons and positrons to pass between a pair of magnets that are spaced apart from one another.

23. A spectrometer according to claim 15 wherein said deflector comprises a pair of magnets spaced apart from one another and positioned such that the corresponding pairs of electrons and positrons pass therebetween.

* * * * *